UNITED STATES PATENT OFFICE.

JONAS W. AYLSWORTH, OF EAST ORANGE, NEW JERSEY, ASSIGNOR TO CONDENSITE COMPANY OF AMERICA, OF EAST ORANGE, NEW JERSEY, A CORPORATION OF NEW JERSEY.

PLASTIC COMPOSITION.

1,111,284.  Specification of Letters Patent.  Patented Sept. 22, 1914.

No Drawing.  Application filed November 4, 1910.  Serial No. 590,601.

*To all whom it may concern:*

Be it known that I, JONAS W. AYLSWORTH, a citizen of the United States, and a resident of East Orange, in the county of Essex and State of New Jersey, have invented a certain new and useful Plastic Composition, of which the following is a description.

My invention relates to an improved soft or hard rubber composition and methods for preparing the same.

It comprises the incorporation with masses of india rubber or cautchouc, or of gutta percha compounded with sulfur or other vulcanizing agent, of a powdered infusible condensation product of phenol or its homologues or derivatives and formaldehyde or other substance containing the methylene radical $CH_2$, which will react with the phenol on application of sufficient heat to form a final condensation product.

The objects of my invention are the production of a novel and useful composition of the character indicated and improved processes by which the same may be formed.

The proportions of the ingredients in my novel composition may be varied within wide limits to suit the particular properties desired in the product. Where high elasticity is desired, the powdered condensation product may be less in proportion than the rubber. When flexibility without much elasticity is desired, the condensation product in powdered form may exceed the rubber, and for some purposes, rubber of a quantity just sufficient to bind the condensation product powder together may be used. Hard compositions for the varied uses of hard rubber may be made by incorporating sufficient sulfur or equivalent vulcanizing agent to convert the rubber into the hard variety with the rubber and the powdered condensation product. In such compounds, it is preferable to use relatively large proportions of the powdered condensation product.

The ingredients of the compounds may be mixed on rubber mixing rolls or other suitable mixing machines, or the powdered condensation product, if in large excess, may be incorporated with a solution of rubber or caoutchouc in a volatile solvent which will hold the vulcanizing agent in solution or in suspension. The solvent is then evaporated, after which the resulting compound may be molded to shape and the compound vulcanized with application of sufficient heat.

I have found that rubber adheres with great tenacity to a hard phenolic condensation product when vulcanized therewith, making an improved rubber product very superior to rubber filled or loaded with the well known fillers used in the art. It has a low specific gravity and does not deteriorate as rapidly as the well known varieties, and is also extremely resistant to abrasion. It also has a very high electrical insulation value.

The hardened final condensation product may be prepared in the manner disclosed in my pending applications Serial Nos. 496,060, filed May 14, 1909; 575,970, filed August 6, 1910, and my Patent No. 1,020,593, dated March 19, 1912. Or it may be prepared by mixing approximately equi-molecular proportions of phenol or cresol and formaldehyde in a retort, a final product solvent element, such as disclosed in my application Serial No. 496,060 referred to, such as nitro or chloro derivatives of naphthalene, preferably being added. The reaction in such a method may be carried on at a moderate temperature under pressure until it is partly complete, when the pressure may be reduced to allow the escape of steam to cause the mass to foam and become porous. By this method the mass may more readily be later crushed to the desired powdered form for incorporation with the rubber. Or the condensation product may be prepared by other methods known in the art.

I prefer to completely harden the condensation product to infusibility and insolubility before incorporation with the rubber and expose it in powdered form to a temperature of from 400 to 500 degrees F. to remove any free phenol, moisture, ammonia, or other volatile substance which may be in the product. This heating may be done in a vacuum or in the air. If it is carried on in a vacuum, a lower temperature than that noted above is sufficient.

The hardened condensation product may have incorporated therewith any of the final product solvent elements, such as are described in my patent and applications above referred to, and also in my Patent No. 1,077,113, granted Oct. 28, 1913, such substances being soluble in the initial mixture of the ingredients and remaining in the final hardened product as a solidified solution or emulsion. Such substances as naphthalene, chloro and nitro derivatives thereof, and the other substances of this character mentioned in my applications above referred to, may be incorporated with the condensation product at any convenient stage of its formation previous to the final hardening thereof into the infusible state, and will give to the powdered final product the various characteristics noted in connection therewith in the applications above referred to, such as rendering the mass somwhat plastic when heated, the characteristic of non-inflammability, etc. A greater measure of non-inflammability than it would otherwise have is imparted to the product when the product solvent used is a non-inflammable organic compound, which term is defined in my Patent No. 1,077,113 referred to, as including such bodies as solid or liquid halogen substitution products of organic substances, which products are stable and may successfully be incorporated with the reaction mass at some stage in its formation previous to the infusible state. Such bodies are the chloro-naphthalenes, chloro-benzenes, chlor-toluenes, chloro-phenols, chloro-anthracenes and per-chloro-ethanes, the chloro-naphthalenes being in some respects the preferred substances.

The particular excellence of this composition seems to be due to the intimate adhesive bond which I have found exists between both hard and soft vulcanized rubber and the hardened phenolic condensation product herein described.

This product is preferably completely hardened, as stated, and must in any case be hardened to such an extent that it will not become sufficiently plastic on application of heat and pressure, to make intimate solution with the rubber.

The result of the process is the formation of a composition in which an infinite number of particles which may be fairly coarse like sea sand, or ultra fine like a precipitate or a ground mineral pigment, are all intimately cemented to their surrounding neighbors by a tenacious elastic bond. The elastic bond as well as the particles of condensation product is highly inert to acids, alkalis, neutral chemical substances, and also to moderate heat and atmospheric influence. The particles of condensation product, if formed of a product which is somewhat plastic when heated will be more or less shaped by the pressure exerted in the vulcanizing of the mass.

This composition may be molded in sheet form and used for many purposes for which other forms of sheet rubber are commonly used. It is particularly applicable to the formation of sheets for packing, floor tiling, gaskets, abrasive surfaces of conveyer belts and other belting, and mechanical rubber goods. For any of these uses, the hardened condensation product in powdered form may be used in proportions varying between 30 and 90 per cent. of the total composition, the remainder being the usual better grade of rubber incorporated with a sufficient amount of vulcanizing agent to make a good elastic soft rubber. After the ingredients have been thoroughly mixed, the mass may be molded if desired and vulcanized at the usual vulcanizing temperatures, as between 260 degrees and 350 degrees F. Compositions having the ingredients present in proportions within the limits above given form pliant flexible products with limited elasticity which may be increased by using the lower proportions of condensation product powder and in a more finely divided condition.

For elastic rubber goods where greater elasticity and strength are desired, such as in the case of vehicle tires, etc., from 5 to 40 per cent. of the condensation product powder in a very finely divided comminuted condition may be used, compounded with a pure gum composition for the binder, together with the proper proportion of sulfur or other vulcanizing agent.

Compositions which are flexible but which will not stretch and which possess a high degree of rigidity, such as those used for forming battery jars, especially rigid packing, valve seats, electrical insulators, etc., are best compounded with a mixture of the finest pulverized phenolic condensation product powder and intermediate sized particles of the powder up to those which will pass through a 50-mesh screen in proportions which may be varied between 50 and 90 per cent. of the product. Rubber compositions varying between 50 and 10 per cent. of the product respectively may be used with the above. The sulfur or other vulcanizing agent may also be varied so as to increase or decrease the flexibility of the product as desired, up to the proportions which produce hard rubber. Exceptionally elastic compositions are also produced by forming the hardened condensation product powder in the form of minute spherical particles cemented together by a bond of pure rubber or rubber of good quality and the required sulfur for vulcanizing. These spherical particles may be made by allowing a stream of molten or fluid partly reaction product of phenol and formaldehyde or other methylene containing agent, or a molten or fluid fusible phenolic condensation product containing mixed therewith the required proportions of hexa-methylene-tetra-amine or other methylene containing agent, to harden the same, as referred to in my applications above mentioned to fall into a jet or blast of heated gases or vapors. The gaseous jet may be heated to such a temperature as to rapidly harden the small spheres of condensation product in contact therewith to such an extent that the small globules will not stick together when collected. The spherical particles may, if desired, be submitted to further heating after having been collected, in a fluid of such a character as to prevent sticking of the particles together, such a fluid being water, light paraffin oils, etc.

The operations above described may be carried on under pressure, if desired, to prevent the formation of pores in the particles, if the masses used are of such a character as to tend to produce the formation of pores during the hardening reaction.

If it is desired to form a product which shall be exceptionally low in specific gravity, I prefer to use a form of condensation product powder in which each individual grain is porous like cork, that is, one in which the pores are molecular and cannot be seen under the microscope. Such a form is produced by hardening the mass in solution in a suitable volatile solvent and subsequently removing the solvent, this treatment leaving voids or microscopic pores in the spaces occupied by the solvent during the solidification of the mass. Such a material is described more fully in my application Serial No. 575,970 above referred to.

The products formed by my invention are resistant to heat and chemical agencies to a far greater extent than rubber compositions compounded with cork, wood flour, and other organic fillers. Cork and wood char and disintegrate when subjected to prolonged heating at about 300° F., whereas the infusible phenolic condensation products used in my improved composition readily withstand prolonged heating up to at least 500° F. Therefore in situations in which a high heat resistance is valuable, as in the case of packing materials, my composition is in this respect quite superior to rubber compositions having cork, wood or other organic fillers. It should also be noted that the granular condensation product in my composition is non-porous in all cases, except in the modification of the product in which the condensation product is made porous by a special process, for the purpose of obtaining exceptionally low specific gravity. Organic fillers, such as cork and wood, described in the prior art, are all porous, and consequently by capillary action tend to absorb water, etc., which decreases the value of products containing the same for certain uses.

Rubber products compounded with mineral fillers in the manner well known in the art have the disadvantage, among others, as compared with my improved product, that they are much heavier, have less strength, and do not make such tough, cohesive compositions as are made by my invention. None of these fillers referred to form an intimte adhesive bond with the rubber such as exists between vulcanized rubber and the hardened phenolic condensation product herein described.

My product is also superior to rubber compounded with both mineral and organic fillers in respect to its electrical insulation properties. The dielectric strength of the condensation product is extremely high, and in fact when it is prepared in the preferred manner, as described for example in my Patent No. 1,020,593, or application Ser. No. 496,060, referred to, and completely dehydrated, it has the unique property that its dielectric strength does not decrease, upon heating the product up to say 212° F., and in some instances its dielectric strength actually increases upon such heating. Probably all other solid bodies, including hard rubber itself, decrease in dielectric strength when heated. The compounding of rubber and powdered condensation product in the manner here described gives a dielectric strength for the composition which is a resultant of the dielectric strengths of rubber and the condensation product, which is accordingly better than that of rubber alone, or of rubber compounded with the well known filling bodies.

Rubber compositions of various colors may be formed by coloring the condensation product by pigments or dyes previous to its incorporation with the rubber substance.

Having now described my invention what I claim and desire to protect by Letters Patent is as follows:—

1. As a new composition of matter, a tough cohesive product comprising an infusible hard phenolic condensation product in granular form incorporated with and tenaciously bound together by a rubber mass, the granules of the condensation product being thoroughly distributed through the said mass, substantially as described.

2. As a new composition of matter, a tough cohesive product comprising vulcanized rubber having an infusible hard phenolic condensation product in powdered form distributed through the same and tenaciously bound together thereby, substantially as described.

3. As a new composition of matter, a tough cohesive product comprising an elastic gum having distributed therethrough and tenaciously bound together thereby, a hard infusible phenolic condensation product in granular form, substantially as described.

This specification signed and witnessed this 1st day of November 1910.

JONAS W. AYLSWORTH.

Witnesses:
DYER SMITH,
ANNA R. KLEHM.